US010690117B2

(12) United States Patent
Slot

(10) Patent No.: US 10,690,117 B2
(45) Date of Patent: *Jun. 23, 2020

(54) METHOD OF CONTROLLING A WIND TURBINE AND RELATED SYSTEM

(71) Applicant: LM WP PATENT HOLDING A/S, Kolding (DK)

(72) Inventor: Mark Olaf Slot, Byrup (DK)

(73) Assignee: LM WP PATENT HOLDING A/S, Kolding (DK)

( * ) Notice: Subject to any disclaimer, the term of this patent is extended or adjusted under 35 U.S.C. 154(b) by 506 days.

This patent is subject to a terminal disclaimer.

(21) Appl. No.: 15/446,176

(22) Filed: Mar. 1, 2017

(65) Prior Publication Data

US 2018/0087488 A1  Mar. 29, 2018

Related U.S. Application Data

(63) Continuation of application No. 14/127,815, filed as application No. PCT/EP2012/061953 on Jun. 21, 2012, now Pat. No. 9,617,977.

(30) Foreign Application Priority Data

Jun. 27, 2011  (EP) .................................... 11171601

(51) Int. Cl.
*F03D 7/04* (2006.01)
*F03D 7/02* (2006.01)

(52) U.S. Cl.
CPC ............. *F03D 7/04* (2013.01); *F03D 7/0224* (2013.01); *F05B 2270/17* (2013.01);
(Continued)

(58) Field of Classification Search
CPC . F03D 7/00; F03D 7/04; F03D 7/0224; F05B 2270/17; F05B 2270/33;
(Continued)

(56) References Cited

U.S. PATENT DOCUMENTS 7,638,894 B2 * 12/2009 Stommel ............... F03D 7/0224
290/44
9,347,435 B2 * 5/2016 Olesen .................. F03D 7/0288
(Continued)

FOREIGN PATENT DOCUMENTS

EP       2726735 B1    8/2016
WO    2009109467 A2    9/2009

*Primary Examiner* — Justin D Seabe
*Assistant Examiner* — Christopher R Legendre
(74) *Attorney, Agent, or Firm* — Nath, Goldberg & Meyer; Jerald L. Meyer; Tanya E. Harkins

(57) ABSTRACT

The present invention relates to a method for controlling a wind turbine, in particular a method for controlling pitch of one or more blades of a wind turbine and related system. The method comprises collecting first data indicative of a dynamic condition of the first wind turbine blade and the rotor, the first data comprising rotor data and first deflection data, the rotor data being indicative of the azimuth position and rotational velocity of the rotor in a rotor plane perpendicular to the rotor axis, and the first deflection data being indicative of the position, speed and acceleration of one or more parts of the first wind turbine blade. Further, the method comprises calculating an expected tower clearance distance at a later time of tower passage for the first wind turbine blade based on the first data including acceleration of one or more parts of the first wind turbine blade, and performing measures to prevent tower collision, if the expected tower clearance distance fulfills a collision risk criterion.

18 Claims, 6 Drawing Sheets

(52) U.S. Cl.
CPC ... *F05B 2270/328* (2013.01); *F05B 2270/329* (2013.01); *F05B 2270/33* (2013.01); *F05B 2270/404* (2013.01); *Y02E 10/723* (2013.01)

(58) Field of Classification Search
CPC .......... F05B 2270/328; F05B 2270/329; F05B 2270/404
See application file for complete search history.

(56) References Cited

U.S. PATENT DOCUMENTS

| | | |
|---|---|---|
| 9,617,977 B2 * | 4/2017 | Slot .......................... F03D 7/04 |
| 2004/0057828 A1 | 3/2004 | Bosche |
| 2011/0140431 A1 | 6/2011 | Landa |
| 2018/0087488 A1 * | 3/2018 | Slot .......................... F03D 7/04 |

* cited by examiner

METHOD OF CONTROLLING A WIND TURBINE AND RELATED SYSTEM

This is a Continuation Application of U.S. patent application Ser. No. 14/127,815, filed Dec. 19, 2013, an application claiming the benefit from European Application No. 11171601.5, filed Jun. 27, 2011, the contents of each of which are hereby incorporated by reference in their entirety.

The present invention relates to a method for controlling a wind turbine, in particular a method for controlling pitch of one or more blades of a wind turbine and related system.

Developments within the wind turbine blade industry move towards increasingly longer wind turbine blades. Long wind turbine blades e.g. with lengths above 50 m are a challenge to engineers due to the stiffness required for the wind turbine blades in order to avoid wind turbine blades colliding with the wind turbine tower. At the same time it is as always desired to keep the production of a wind turbine optimized at any given point in time in order to provide the maximum output without undesired wear or damage to the respective wind turbine components which may require time consuming repairs or diminish wind turbine lifetime.

SUMMARY

It is an object of the present invention to provide an improved system and method which reduce or eliminate the risk of wind turbine blades colliding with the wind turbine tower during operation and at the same time optimize production of the wind turbine.

Accordingly, a method of controlling a wind turbine comprising a tower and a rotor provided on top of the tower, the rotor comprising one or more wind turbine blades including at least a first wind turbine blade that rotates about a rotor axis is provided, the method comprising the steps of: collecting first data indicative of a dynamic condition of the first wind turbine blade and the rotor, the first data comprising rotor data and first deflection data, the rotor data being indicative of the azimuth position and rotational velocity of the rotor in a rotor plane perpendicular to the rotor axis, and the first deflection data being indicative of the position, speed and acceleration of one or more parts of the first wind turbine blade. Preferably, the acceleration comprises the acceleration of the wind turbine blade in a direction perpendicular to the rotor plane. Further the method comprises calculating an expected wind turbine blade position, e.g. tower clearance distance or an expected deflection from a reference plane, e.g. a rotor plane, at a later time of tower passage for the first wind turbine blade based on the first data including acceleration of one or more parts of the first wind turbine blade, preferably acceleration in a direction perpendicular to the rotor plane, and performing measures to prevent tower collision, if the expected tower clearance distance fulfills a collision risk criterion. Preferably, the data comprises the instantaneous or real-time acceleration. This is preferable to an averaged acceleration value, which may be slow to respond to sudden changes in blade acceleration.

Also disclosed is a wind turbine controller for controlling a wind turbine comprising a tower and a rotor provided on top of the tower, the rotor comprising one or more wind turbine blades including at least a first wind turbine blade that rotates about a rotor axis, the wind turbine controller comprising a controller interface and a processor connected to the controller interface, the wind turbine controller being configured for receiving one or more signals indicative of a dynamic condition of the first wind turbine blade and the rotor. The wind turbine controller is configured for collecting first data indicative of a dynamic condition of the first wind turbine blade and the rotor, the first data comprising rotor data and first deflection data, the rotor data being indicative of the azimuth position and rotational velocity of the rotor in a rotor plane perpendicular to the rotor axis, and the first deflection data being indicative of the position, speed and acceleration of one or more parts of the first wind turbine blade, and calculating an expected position, e.g. tower clearance distance or deflection from rotor plane at a later time of tower passage for the first wind turbine blade based on the first data including acceleration of one or more parts of the first wind turbine blade, and performing measures to prevent tower collision, if the expected tower clearance distance fulfills a collision risk criterion.

It is an advantage of the present invention that the number or extent of individual pitching events can be reduced thereby providing less wear on bearings and other turbine components. Pitching of a wind turbine blade in order to avoid tower collisions has a negative impact on the productivity of the wind turbine. Accordingly, it is desired to reduce or eliminate the number of unnecessary pitching events to optimize production.

The method and system present an additional refinement of the risk assessment and the collision prevention of wind turbine blades colliding with the tower. The present method and system utilise knowledge of both instantaneous velocity and acceleration of the wind turbine blade(s). Further, the method and system may use knowledge of deflection patterns relating to the preventive measures, which means that the preventive measures can be tailored and/or made for a shorter period. Further, the tower clearance threshold may be minimised. Thereby, the method minimises strains and loads inflicted on the wind turbine blade(s) and maximises energy yield of the wind turbine.

By monitoring for the flapwise acceleration of the wind turbine blade, which is in an out-of-plane direction with respect to the rotor plane, the position of the blade at the time of tower passage can be more accurately predicted than in prior art systems, which have previously only considered rotor acceleration within the rotor plane, i.e. along the rotational path of the blades.

In a preferred embodiment, the step of calculating an expected wind turbine blade position is based on (1) an acceleration value, preferably an out-of-plane deflection value, and (2) a separate deflection data value, e.g. a position value, a speed value, an acceleration value within the rotor plane, etc. By basing the predicted deflection calculation on an acceleration value, preferably out-of-plane acceleration, and a second, separate deflection value, improved accuracy of the system can be provided over prior art systems.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
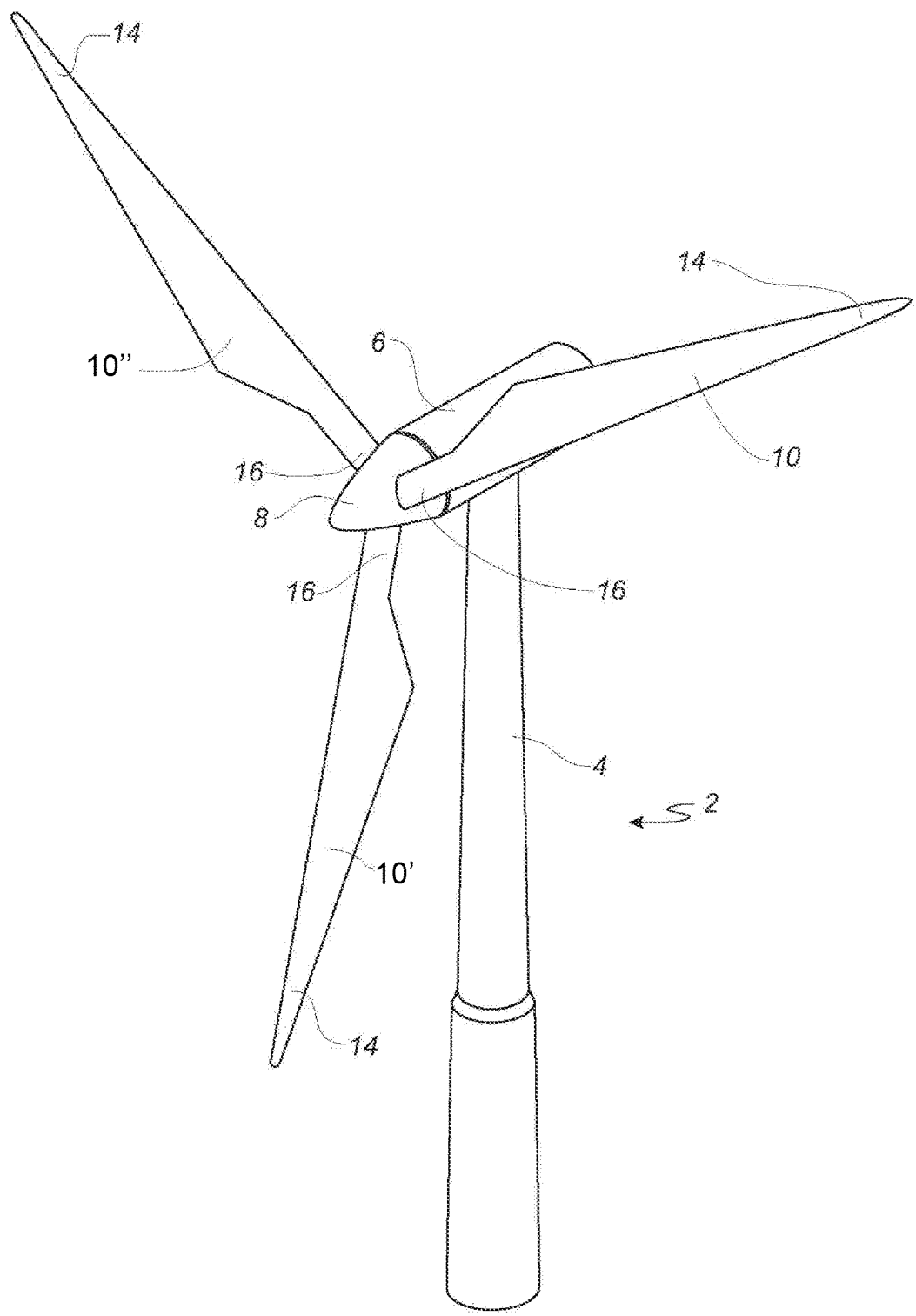
FIG. 1 schematically illustrates a wind turbine.

The figures are schematic and simplified for clarity, and they merely show details which are essential to the understanding of the invention, while other details have been left out. Throughout, the same reference numerals are used for identical or corresponding parts.

The method comprises collecting data, including first data, indicative of a dynamic condition of the first wind turbine blade and the rotor. The first data comprises rotor data being indicative of the azimuth position $\Psi$ of the rotor and rotational velocity $\omega$ of the rotor in a rotor plane perpendicular to the rotor axis, enabling determination of azimuth position $\Psi_1$ of the first wind turbine blade and rotational velocity $\omega_1$ of the first wind turbine blade in a rotor plane perpendicular to the rotor axis. Further, the first data comprises first deflection data being indicative of the position X, speed X' and acceleration X" of one or more parts of the first wind turbine blade, e.g. perpendicular to the rotor plane, i.e. out of the rotor plane. The first deflection data enables determination of deflection or position $X_1$, $X_2$, $X_3$ of one or more parts or points of the wind turbine blade in relation to the rotor plane.

In the present disclosure, the rotor plane is used as a reference plane, however other reference coordinates may be employed for example by using a suitable transformation of coordinates.

The method comprises calculating an expected tower clearance distance or expected deflection at a later time of tower passage for the first wind turbine blade based on the first data including acceleration of one or more parts of the first wind turbine blade.

Further, the method comprises performing measures to prevent tower collision, if the expected tower clearance distance or the expected deflection fulfills a collision risk criterion.

The presently disclosed method enables a more precisely modeled behavior of the wind turbine blade leading to a reduced number/frequency and/or extent of measures to prevent tower collision leading to a higher yield. A wind turbine may also be able to operate with lower safety margins for tower clearance thereby enabling higher yield. A low number of measures to prevent tower collision is desirable in order to reduce wear on wind turbine parts.

In the method, the first data may comprise wind data indicative of the wind velocity and/or the first data may comprise pitching data, e.g. including pitch angle $\theta_1$ of the first wind turbine blade.

Mechanical properties of the wind turbine blade may be included in the calculation of an expected tower clearance. For example, calculating an expected tower clearance distance may be based on a stiffness of the first wind turbine blade. Alternatively or in addition thereto, calculating an expected tower clearance may be based on a known first deflection pattern of the first wind turbine blade. Deflection pattern parameters may be stored in a memory of the wind turbine controller. First deflection pattern parameters may be adjusted during operation of the wind turbine based on the collected first data.

Calculating an expected tower clearance distance at a later time of tower passage for the first wind turbine blade based on the first data may comprise calculating an expected tower clearance distance or deflection $X_{exp,0}$ if no measures are taken to prevent tower collision and/or calculating a primary expected tower clearance distance or deflection $X_{exp,1}$ if measures are taken to prevent tower collision. An expected tower clearance distance may be calculated for different pitching schemes or measures to prevent tower collision, e.g. a primary expected tower clearance distance or deflection $X_{exp,1}$ may be calculated for a primary pitching scheme and a secondary expected tower clearance distance or deflection $X_{exp,2}$ may be calculated for a secondary pitching scheme. The collision risk criterion may be based on the primary and/or the secondary expected tower clearance distances. Accordingly, the method may comprise determining if measures to prevent or avoid tower collision are to be taken and which measures are to be taken to prevent or avoid tower collision.

In the method, the step of performing measures to prevent tower collision may comprise starting the measures at a first azimuth start position $\Psi_{1,start}$ of the first wind turbine blade or starting the measures at a first time $t_{1,start}$ before tower passage.

Performing measures to prevent tower collision may comprise pitching the first wind turbine blade according to one or more first pitching schemes including a first primary pitching scheme. Evaluation of the collision risk criterion may determine which pitching scheme to use. The method may comprise determining the first primary pitching scheme based on the first data, i.e. the pitching scheme may be adapted to the operating conditions based on the first data. The method may comprise determining the first primary pitching scheme based on a known first deflection pattern of the first wind turbine blade caused by the pitching. The method may comprise determining the first primary pitching scheme such that the expected tower clearance distance is in the range from a first expected clearance value to a second expected clearance value. Thereby out-of-plane deflection caused by the pitching may be minimized or reduced resulting in diminished wear on turbine components and higher yield.

The method may comprise selecting between one or more predetermined pitching schemes based on one or more expected tower clearance distances $X_{exp,0}$ (no measures), $X_{exp,1}$ (primary pitching scheme), $X_{exp,2}$ (secondary pitching scheme), $X_{exp,3}$ (tertiary pitching scheme) for different operating/pitching schemes. For example, performing measures to prevent tower collision may comprise pitching the first wind turbine blade according to a first primary pitching scheme if the expected tower clearance distance $X_{exp,0}$ is less than a first threshold value. Further or as an alternative, performing measures to prevent tower collision may comprise pitching the first wind turbine blade according to a first secondary pitching scheme if the expected tower clearance distance $X_{exp,0}$ is in the range from a first threshold value to a second threshold value.

In the method, performing measures to prevent tower collision may comprise pitching the first wind turbine blade according to a first primary pitching scheme if the expected tower clearance distance $X_{exp,1}$ related to the first primary pitching scheme is less than a first threshold value.

In the method, performing measures to prevent tower collision may comprise pitching the first wind turbine blade according to a first primary pitching scheme if the expected deflection $X_{exp,1}$ related to the first primary pitching scheme is larger than a first threshold value.

Performing measures to prevent tower collision may comprise pitching the first wind turbine blade according to a first primary pitching scheme if an expected blade deflection $X_{exp,0}$ is in the range from a first threshold value to a second threshold value. Further or as an alternative, performing measures to prevent tower collision may comprise pitching the first wind turbine blade according to a first secondary pitching scheme if the expected blade deflection $X_{exp,0}$ is larger than a second threshold value.

Different pitching schemes allows more precise control of actual tower clearance distance, which in turn minimizes or reduces overcompensation leading to less wear and higher energy yield.

In order to further increase the validity and performance of the method, the method may comprise collecting deflection from a plurality of wind turbine blades of the wind turbine. For example, the method may comprise collecting second deflection data indicative of the position, speed and acceleration of one or more parts of a second wind turbine blade of the wind turbine and calculating an expected tower clearance distance for the first wind turbine blade may be based on the second data of the second wind turbine blade.

As the second wind turbine blade will precede the first wind turbine blade along the rotational path of the rotor, any data collected from sensors etc. located on the second blade can provide an indication of localized instances of wind turbulence, e.g. eddies. Accordingly, the deflection data collected from the second wind turbine blade can be used to more accurately calculate the predicted deflection of the first wind turbine blade. Preferably, the second deflection data is a measure of the same characteristic value as the first deflection data collected from the first wind turbine blade, as this allows for a direct comparison between the different data sets.

In the method, calculating one or more expected tower clearance distances for one or more different operating schemes ("no measures taken", primary pitching scheme, secondary pitching scheme, etc.) may comprise determining an expected time to tower passage $\Delta t$ and calculating one or more expected tower clearance distances or deflections $X_{exp,0}$ (no measures), $X_{exp,1}$ (primary pitching scheme), $X_{exp,2}$ (secondary pitching scheme), $X_{exp,3}$ (tertiary pitching scheme), etc. at a later time of tower passage for the first wind turbine blade based on the expected time to tower passage $\Delta t$.

In one or more embodiments of the method, the expected tower clearance distance(s) or deflection(s) may be calculated as worst case tower clearance distance(s) or deflection(s) based on the position, speed and acceleration of one or more parts of the first wind turbine blade. The worst case tower clearance distance(s) or deflection(s) may be based on a known first deflection pattern of the first wind turbine blade.

In the following, an example of estimating the expected blade tip deflection at a later time of tower passage for the first wind turbine blade is described in more detail.

The total acceleration of a wind turbine blade denoted $\ddot{x}$ or X" (where X is the deflection from a rotor plane perpendicular to the rotor axis) may be determined as the sum of an aerodynamic and a structural contribution:

$$\ddot{x} = \ddot{x}_{aerodynamic} + \ddot{x}_{structure}$$

The aerodynamic contribution can be split up into a part caused by the wind and a part caused by the pitching of the wind turbine blade:

$$\ddot{x}_{aerodynamic} = \ddot{x}_{wind} + \ddot{x}_{pitch}$$

The wind part is generally not known, but the initial condition can be found from the equation:

$$\ddot{x}_{wind}(0) = \ddot{x}(0) - \ddot{x}_{structure}(0) - \ddot{x}_{pitch}(0).$$

The structural contribution $\ddot{x}_{structure}$ may be calculated as:

$$\ddot{x}_{structure}(0) = -x(0) \cdot \omega_{blade}^2, \text{ where } \omega_{blade} = f_{blade} \cdot 2\pi,$$

where $f_{blade}$ is the smallest natural frequency of the wind turbine blade. The natural frequency of the blade $f_{blade}$ may be modeled or determined for each wind turbine blade during manufacture.

The aerodynamic contribution caused by the pitching of the wind turbine blade $\ddot{x}_{pitch}$ may be calculated or estimated as:

$$\ddot{x}_{pitch}(0) = \alpha_1 \cdot \left(\frac{\omega(0)}{\omega_{nom}}\right)^2 \cdot \frac{\theta(0)}{\dot{\theta}_{max}},$$

where $\alpha_1$ is an empirical constant that depends on e.g. the maximum pitch rate, the lift slope of the profiles etc., $\omega(0)$ is the current rotational velocity of the rotor in a rotor plane perpendicular to the rotor axis, $\omega_{nom}$ is a turbine dependent normalizing factor, e.g. in the range from 8 to 15 RPM, such as 11.5 RPM, $\theta(0)$ is the current pitch angle and $\dot{\theta}_{max}$ is a constant indicative of the maximum pitching velocity of the blade pitching system. The empirical constant $\alpha_1$ may be in the range from about $-100$ m/s$^3$ to about 10 m/s$^3$. For one or more pitching schemes, $\alpha_1$ may be $-40$ m/s$^3$. The maximum pitching velocity $\dot{\theta}_{max}$ may for a primary pitching scheme be set to 8 degrees/s.

Accordingly, the initial condition of the wind part can now be determined; however the development of the wind part in the near future is unknown. The development of the wind part may be modeled assuming a worst case scenario. It may be assumed that the wind part has a maximum level because the wind turbine blade can only generate a finite maximum lift. This level is assumed to be:

$$\ddot{x}_{wind,max} = \beta_1 \cdot \left(\frac{\omega}{\omega_{nom}}\right)^2,$$

Where $\beta_1$ is an empirical constant that depends on e.g. the maximum lift properties of the blade, the blade mass etc, $\omega$ is the rotational velocity of the rotor in a rotor plane perpendicular to the rotor axis, $\omega_{nom}$ is a turbine dependent normalizing factor, e.g. in the range from 8 to 15 RPM, such as 11.5 RPM. $\beta_1$ may be in the range from about 50 m/s$^2$ to about 200 m/s$^2$. In one or more embodiments, $\beta_1$ may be 130 m/s$^2$. The rotational velocity of the rotor $\omega$ may be considered as being constant in the time range of interest, i.e. $\omega$ may be set to the current rotational velocity of the rotor.

Furthermore, it may be assumed that the wind part cannot jump instantly from the initial condition to the maximum level. Due to the physics of turbulent wind etc., there is a reasonable maximum slope of the wind part. It may be assumed that the maximum slope of the wind part is:

$$\dddot{x}_{wind,max} = \beta_2 \cdot \left(\frac{\omega}{\omega_{nom}}\right)^2,$$

where $\beta_2$ is an empirical constant that depends on e.g. the maximum velocity gradients in the turbulent wind field, the rotational speed of the rotor, the lift slope of the profiles etc. The empirical constant $\beta_2$ may be in the range from about 50 m/s$^3$ to about 100 m/s$^3$. In one or more embodiments, $\beta_2$ may be 80 m/s$^3$.

The wind part contribution $\ddot{x}_{wind}(t)$ may be modeled by:

$$\ddot{x}_{wind}(t) = \begin{cases} \ddot{x}_{wind}(0) + \dddot{x}_{wind,max} \cdot t & \text{for } 0 \leq t \leq t^* \\ \ddot{x}_{wind,max} & \text{for } t > t^* \end{cases},$$

$$t^* = \frac{\ddot{x}_{wind,max} - \ddot{x}_{wind}(0)}{\dddot{x}_{wind,max}}$$

The wind part contribution $\ddot{x}_{wind}(t)$ and/or $\dddot{x}_{wind}(t)$ may be modeled based on first deflection data of earlier tower passages of the first wind turbine blade and/or second deflection data of earlier tower passages of a second wind turbine blade. The wind part contribution $\ddot{x}_{wind}(t)$ and/or $\dddot{x}_{wind}(t)$ may be modeled based on third deflection data for a third wind turbine blade.

The wind part contribution $\ddot{x}_{wind}(t)$ and/or $\dddot{x}_{wind}(t)$ may be modeled based on first deflection data for a first time segment and be based on second and/or third deflection data for earlier tower passages for a second time segment. Accordingly, the time to tower passage may be split into time segments. Different model parameters may be used for modeling the expected position or deflection of the first wind turbine blade for different time segments.

The pitch part contribution $\ddot{x}_{pitch}(t)$ may be modeled by:

$$\ddot{x}_{pitch}(t) = \alpha_1 \cdot \left(\frac{\omega(t)}{\omega_{nom}}\right)^2 \cdot \frac{\theta(t)}{\theta_{max}},$$

Where $\alpha_1$ is an empirical constant that depends on e.g. the maximum pitch rate, the lift slope of the profiles etc. The empirical constant $\alpha_1$ may be in the range from about $-100$ m/s$^3$ to about $-10$ m/s$^3$. For one or more pitching schemes, $\alpha_1$ may be $-40$ m/s$^3$. The rotational velocity of the rotor $\omega(t)$ may be considered as being constant in the time range of interest and may be set to the current rotational velocity of the rotor, i.e. $\omega(t)=\omega(0)$.

Assuming that maximum pitch rate is applied in order to avoid a tower collision, the pitch part as function of time may be given as:

$$\ddot{x}_{pitch}(t) = \ddot{x}_{pitch}(0) + \dddot{x}_{pitch} \cdot t,$$

where $\dddot{x}_{pitch}$ may be a constant or calculated for each iteration as a function of the current rotational velocity $\omega$, e.g. given as:

$$\dddot{x}_{pitch} = \alpha_2 \cdot \left(\frac{\omega(0)}{\omega_{nom}}\right)^2$$

The empirical constant $\alpha_2$ may be in the range from about $-100$ m/s$^3$ to about 10 m/s$^3$. For one or more different pitching schemes, $\alpha_2$ may be $-40$ m/s$^3$.

Combining the above equations, two combined, linear, inhomogeneous second order partial differential equations are derived. These can be solved analytically in two steps: First the first part of the equation is solved for $t^* \leq t^*$. If $\Delta t > t^*$, the results for $t^*$ are then used as initial conditions for solving the second part of the equation for $t > t^*$. $\Delta t$ is the time to next tower passage for the first wind turbine blade and given by:

$$\Delta t = \frac{2\pi - \Psi_1}{\omega},$$

where $\Psi_1$ is the azimuth position of the first wind turbine blade derived from the azimuth position of the rotor and $\omega$ is the rotational velocity of the rotor in a rotor plane perpendicular to the rotor axis.

For solving the partial differential equation, coefficients for the first part of the combined, partial differential equations are calculated. The coefficients may be given as:

$$c = \dddot{x}_{wind,max} + \dddot{x}_{pitch}(0)$$

$$d = \ddot{x}_{wind}(0) + \ddot{x}_{pitch}(0)$$

$$c_1 = x(0) - \frac{d}{\omega_{blade}^2}$$

$$c_2 = \frac{\dot{x}(0) - \frac{c}{\omega_{blade}^2}}{\omega_{blade}}$$

It is assumed that $\ddot{x}_{wind}$ and $\ddot{x}_{pitch}$ are linear in order to solve the differential equation analytically. Further $\dddot{x}_{wind,max}$ and $\dddot{x}_{pitch}$ are assumed to be constant in the respective time frame.

The time to tower passage may be split in different time segments in order to solve the equation for different dynamic conditions.

If $\Delta t \leq t^*$, the expected blade tip deflection $x(\Delta t)$ at next tower passage can be calculated directly by:

$$x(\Delta t) = c_1 \cdot \cos(\omega_{blade} \cdot \Delta t) + c_2 \cdot \sin(\omega_{blade} \cdot \Delta t) + \frac{c \cdot \Delta t + d}{\omega_{blade}^2},$$

$$\Delta t \leq t^*$$

If $\Delta t > t^*$, the boundary conditions between the two parts of the combined, partial differential equations have to be calculated:

$$x(t^*) = c_1 \cdot \cos(\omega_{blade} \cdot t^*) + c_2 \cdot \sin(\omega_{blade} \cdot t^*) + \frac{c \cdot t^* + d}{\omega_{blade}^2}$$

$$\dot{x}(t^*) = -c_1 \cdot \omega_{blade} \cdot \sin(\omega_{blade} \cdot t^*) + c_2 \cdot \omega_{blade} \cdot \cos(\omega_{blade} \cdot t^*) + \frac{c}{\omega_{blade}^2}$$

Then, new coefficients for the second part of the combined, partial differential equations are calculated:

$$c^* = \dddot{x}_{pitch}(t^*)$$

$$d^* = \ddot{x}_{wind,max} + \ddot{x}_{pitch}(t^*)$$

$$c_1^* = x(t^*) - \frac{d^*}{\omega_{blade}^2}$$

$$c_2^* = \frac{\dot{x}(t^*) - \frac{c^*}{\omega_{blade}^2}}{\omega_{blade}}$$

$\dddot{x}_{pitch}(t^*)$ may be regarded as constant and accordingly $c^* = \dddot{x}_{pitch}(t^*) = \dddot{x}_{pitch}(0)$. Finally, the expected blade tip deflection $x(\Delta t)$ at next tower passage can be calculated by:

$$x(\Delta t) = c_1^* \cdot \cos(\omega_{blade} \cdot (\Delta t - t^*)) +$$
$$c_2^* \cdot \sin(\omega_{blade} \cdot (\Delta t - t^*)) + \frac{c^* \cdot (\Delta t - t^*) + d^*}{\omega_{blade}^2}, \Delta t > t^*$$

Expected deflections $X_{exp,0}$, $X_{exp,1}$, $X_{exp,2}$, . . . may be calculated for different pitching schemes by changing the parameters of the model.

$X_{exp,0}$, may be calculated by setting $\ddot{x}_{pitch}(t)=0$.

Different pitching schemes may be modeled using different values for empirical constants $\alpha_1, \alpha_2, \beta_1, \beta_2$. Different values for $\alpha_1, \alpha_2, \beta_1, \beta_2$ may be combined with different values for $\dot{\theta}_{max}$.

Parameters of the model may be updated for each calculation of the expected deflection. Expected deflection may be calculated at a frequency larger than 10 Hz, e.g. at a frequency of 50 Hz or more.

In the method, calculating an expected tower clearance distance at a later time of tower passage for the first wind turbine blade may comprise calculating a primary expected tower clearance distance or deflection $X_{exp,1}$ for a primary pitching scheme (e.g. max pitching is applied).

The collision risk criterion may be based on one or more expected deflections $X_{exp,0}$, $X_{exp,1}$, $X_{exp,2}$. In one or more embodiments, the collision risk criterion is based on a primary expected tower clearance distance or deflection $X_{exp,1}$ at tower passage for a primary pitching scheme different from the present operating scheme of the wind turbine.

The method as described herein may be implemented as a part of a wind turbine controller or as a pitch controller configured for controlling one or more wind turbine blades.

FIG. 1 illustrates a conventional modern upwind wind turbine 2 according to the so-called "Danish concept" with a tower 4, a nacelle 6 and a rotor with a substantially horizontal rotor shaft. The rotor comprises a hub 8 and three blades 10, 10', 10" extending radially from the hub 8, each blade having a blade root 16 nearest the hub and a blade tip 14 furthest from the hub 8. The rotor has a radius denoted R. The wind turbine comprises a sensor system (not shown) providing first data indicative of a dynamic condition of the first wind turbine blade 10 and the rotor, the first data comprising rotor data and first deflection data, the rotor data being indicative of the azimuth position and rotational velocity of the rotor in a rotor plane perpendicular to the rotor axis, and the first deflection data being indicative of the position, speed and acceleration of one or more parts of the first wind turbine blade. The sensor system or parts thereof may be mounted or embedded in the wind turbine blade and/or the sensor system may comprise externally mounted parts.

Figure 2:
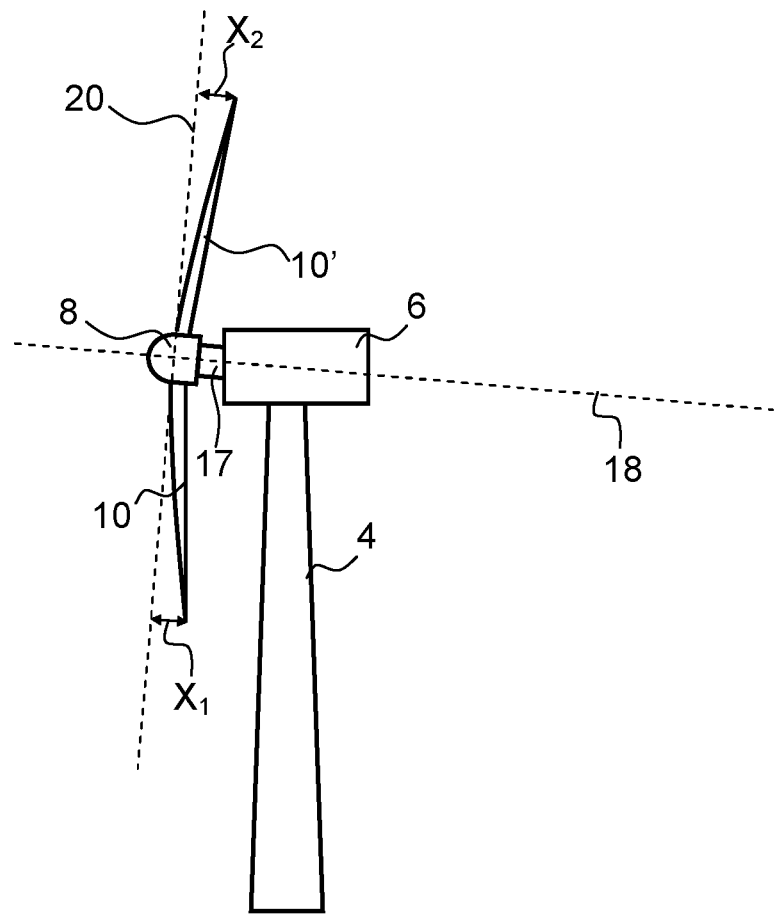
FIG. 2 schematically illustrates side view of a wind turbine.

FIG. 2 illustrates a wind turbine with rotor 17, hub 8 and wind turbine blades 10, 10' rotating about a rotor axis 18. $X_1$ and $X_2$ indicates deflection of a part or point (e.g. the tip) of the first wind turbine blade 10 and the second wind turbine blade 10', respectively, from a rotor plane 20 perpendicular to the rotor axis 18.

Figure 3:
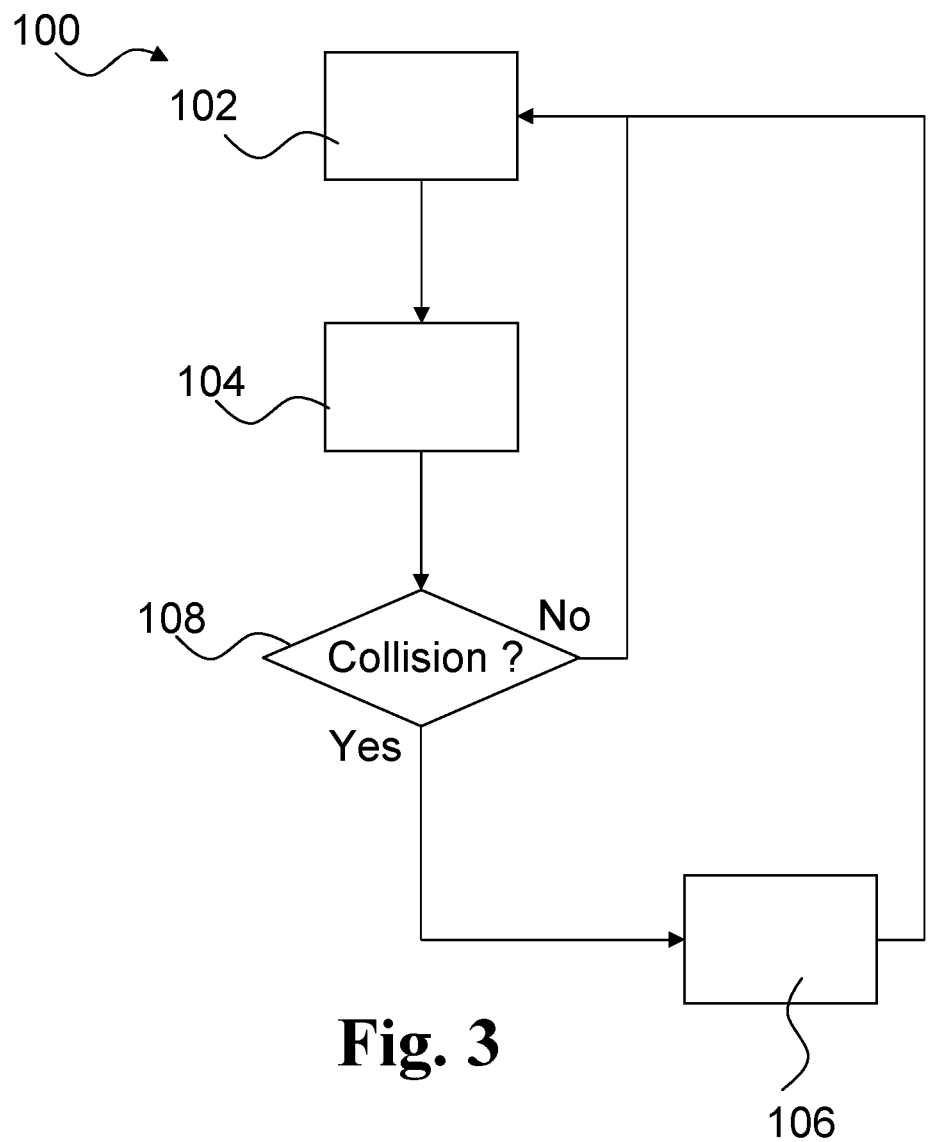
FIG. 3 is an exemplary flow diagram of the method.

FIG. 3 shows an exemplary flow diagram of the method. The method 100 of controlling a wind turbine comprises collecting 102 first data indicative of a dynamic condition of the first wind turbine blade and the rotor, the first data comprising rotor data and first deflection data, the rotor data being indicative of the azimuth position and rotational velocity of the rotor in a rotor plane perpendicular to the rotor axis, and the first deflection data being indicative of the position, speed and acceleration of one or more parts of the first wind turbine blade. The method proceeds to calculating 104 an expected tower clearance distance or an expected deflection at a later time of tower passage for the first wind turbine blade based on the first data including acceleration of one or more parts of the first wind turbine blade, and measures to prevent tower collision are initiated 106 or performed if the expected tower clearance distance fulfills a collision risk criterion 108.

The expected deflection $X_{exp}$ may be given as:

$$X_{exp} = f(X_1, X_1', X_1'', \omega, \theta_1, \psi),$$

where $X_1$ is position of a part or point of the first wind turbine blade (deflection from the rotor plane), e.g. the tip, $X_1'$, is the speed in a direction perpendicular to the rotor plane, $X_1''$ is the acceleration of a part or point of the first wind turbine blade perpendicular to the rotor plane, w is the rotational velocity of the rotor, $\theta_1$ is the pitch angle of the first wind turbine blade, and y is the azimuth position of the rotor. Calculating or determining the expected deflection or tower clearance distance as a function of the acceleration X" provides a more accurate and precise evaluation of the expected deflection. Thereby the number and/or frequency of measures for preventing tower collision may be reduced significantly.

In an embodiment, the measures to prevent tower collision are initiated or performed if the expected deflection $X_{exp,0}$ or $X_{exp,1}$ at tower passage is larger than a first threshold value $X_{thres,1}$. The first threshold value $X_{thres,1}$ is selected based on knowledge of the construction of the wind turbine, e.g. in the range from 2 to 15 m. A safety margin may be incorporated in the first threshold value. The expected deflection may be readily transformed to an expected tower clearance distance and vice versa. In such case, a collision risk criterion may be met if an expected tower clearance distance is less than a first threshold value $X_{thres,1}$. The collision risk criterion may be based on one or a plurality of logical expressions, for example by incorporating an expected deflection or tower clearance distance for each of one or more pitching schemes.

For example, where expected deflection $X_{exp,0}$ (no measures taken) and expected deflection $X_{exp,1}$ (primary pitching scheme applied) are calculated, the collision risk criterion may be based on both $X_{exp,0}$ and $X_{exp,1}$. In one or more embodiments, the collision risk criterion may be fulfilled if $X_{exp,0} > X_{thres,1}$ and $X_{exp,1} > X_{thres,2}$, where $X_{thres,1}$ is a first threshold value and $X_{thres,2}$ is a second threshold value. Furthermore, the collision risk criterion may be based on one or more of $X_1$, $X_1'$, $X_1''$, $\omega$, $\theta_1$ or $\Psi$ or values derived therefrom.

The collision risk criterion may be based on the time $\Delta t$ to expected tower passage. For example, the collision risk criterion may comprise an evaluation of $\Delta t$ in order to be able to take the necessary measures to prevent tower collision as late as possible. For example, the collision risk criterion may be fulfilled if $X_{exp,0} > X_{thres,1}$ and $\Delta t < T_{thres,1}$, where $X_{thres,1}$ is a first threshold value and $T_{thres,1}$ is a first time threshold value.

Calculating or determining the expected deflection or tower clearance distance as a function of the acceleration X" provides a more accurate and precise evaluation of the expected deflection. Further, modeling the expected data based on expected and/or current behavior of the acceleration of the wind provide improved results.

Figure 4:
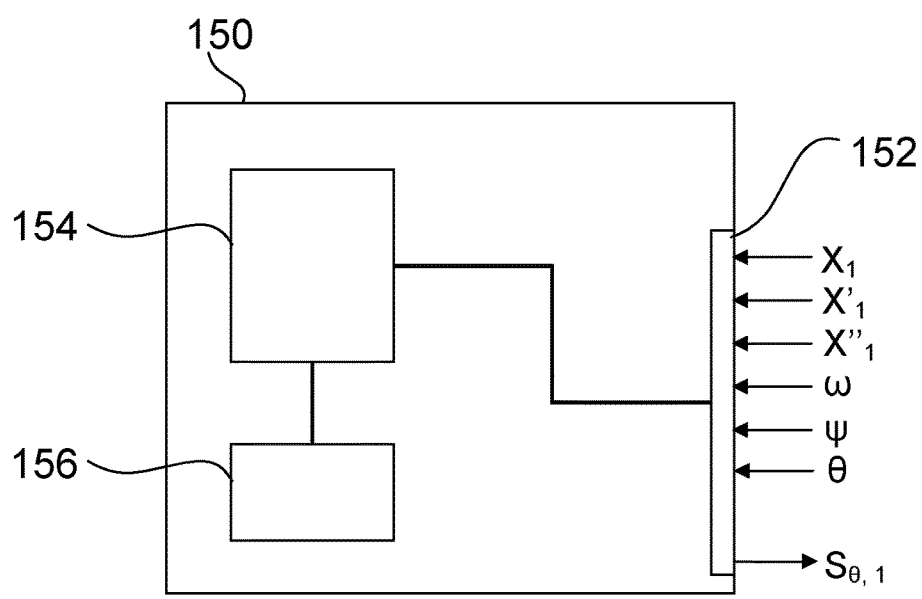
FIG. 4 schematically illustrates a wind turbine controller.

FIG. 4 illustrates a wind turbine controller 150 for controlling a wind turbine. The wind turbine controller 150 comprises a controller interface 152 and a processor 154 connected to the controller interface 152. The wind turbine controller 150 is configured for receiving one or more signals, e.g. from a sensor system of the wind turbine, via the controller interface 152, thereby being configured for collecting first data indicative of a dynamic condition of the first wind turbine blade and the rotor. The first data comprises first deflection data ($X_1$, $X'_1$, $X''_1$) and optionally rotor data ($\Psi$, $\omega$), the rotor data being indicative of the azimuth position and rotational velocity of the rotor in a rotor plane perpendicular to the rotor axis. The first deflection data is indicative of the position ($X_1$), speed ($X'_1$) and acceleration ($X''_1$) of one or more parts of the first wind turbine blade. Further, the wind turbine controller 150 is configured for calculating one or more expected tower clearance distances at a later time of tower passage for the first wind turbine blade based on the first data including acceleration of one or more parts of the first wind turbine blade, and performing measures to prevent tower collision, e.g. by sending pitch control signal ($S_{\theta,1}$) for controlling the pitch of the first wind turbine blade, if the expected tower clearance distance fulfills a collision risk criterion, i.e. if the risk of tower collision is too high. The wind turbine controller may comprise memory 156 connected to the processor 154. Known deflection patterns for wind turbine blades may be stored in the memory 156, e.g. first deflection pattern parameters, such as natural frequency or frequencies of the first wind turbine blade 10 may be stored in the memory 156.

Figure 5:
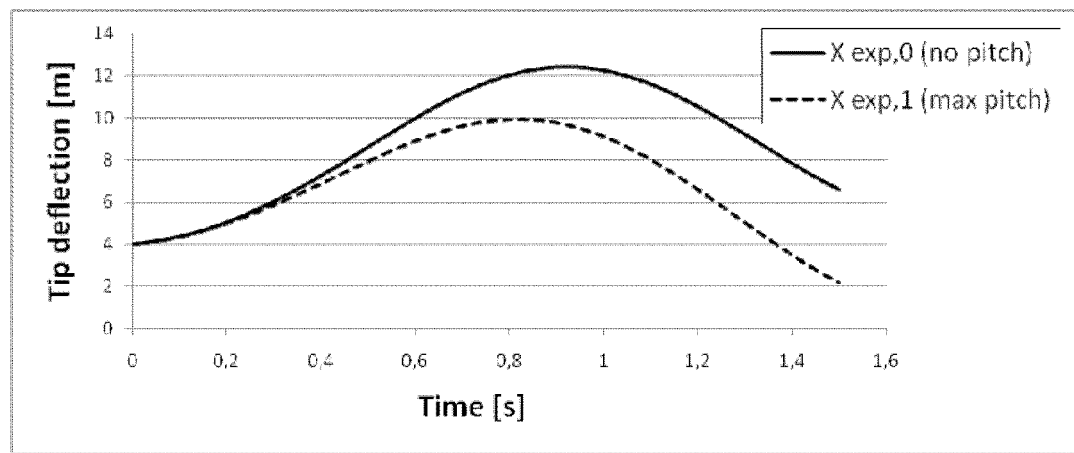
FIG. 5 is a graph showing expected deflection of a first wind turbine blade.
Figure 6:
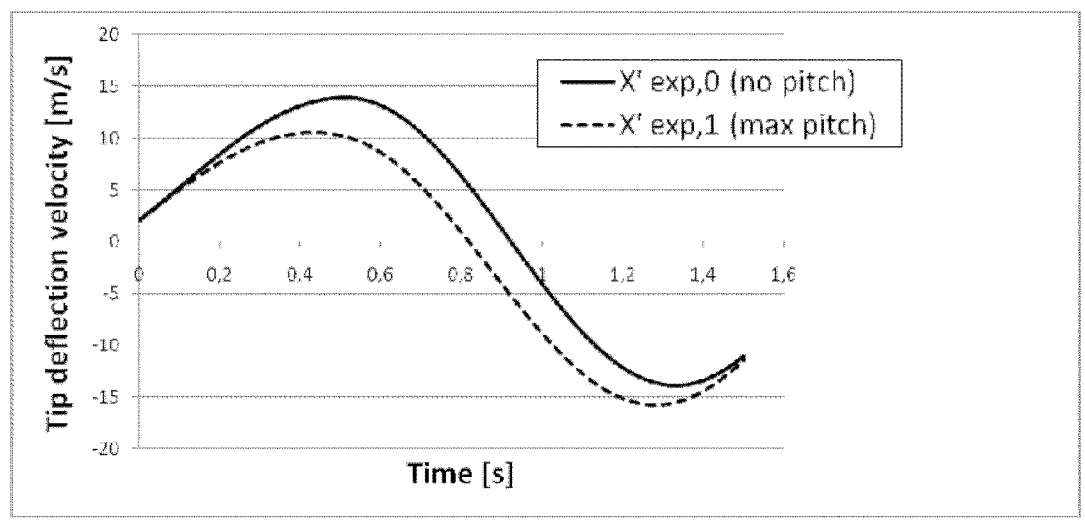
FIG. 6 is a graph showing expected deflection velocity of a first wind turbine blade.
Figure 7:
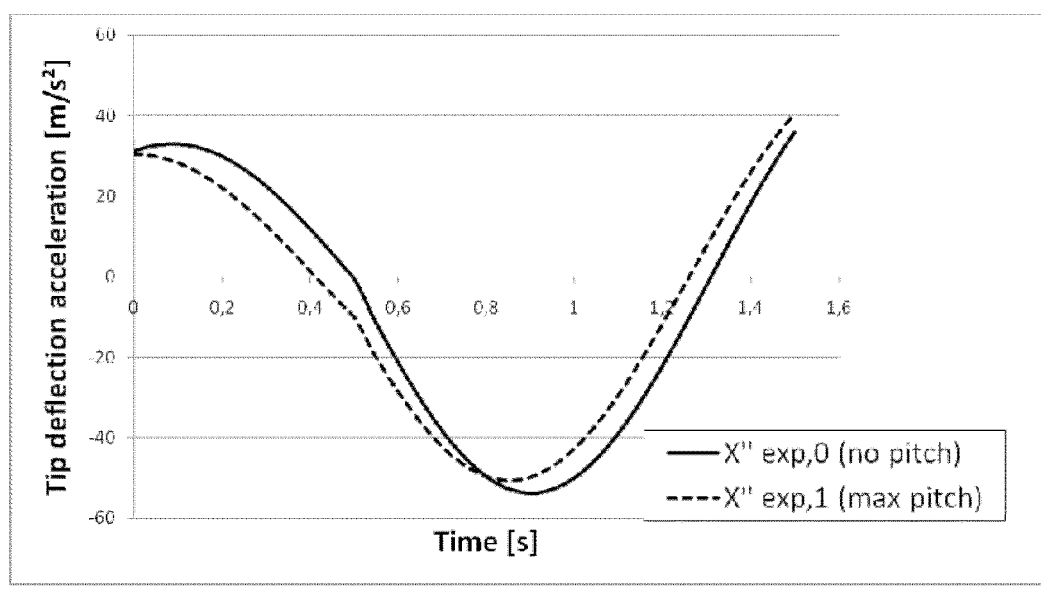
FIG. 7 is a graph showing expected deflection acceleration of a first wind turbine blade.

FIGS. 5-7 illustrate exemplary graphs for expected deflections, deflection velocity and deflection acceleration of a first wind turbine blade as a function of time for a "no measure" pitching scheme and a primary pitching scheme where max pitching is applied to the first wind turbine blade. In the illustrated graphs, the empirical constants of the model described above are set according to the table below.

|  | $X_{exp,0}$ | $X_{exp,1}$ |
|---|---|---|
| $\alpha_1$ | $-40$ m/s$^2$ | $-40$ m/s$^2$ |
| $\alpha_2$ | 0 | $-40$ m/s$^3$ |
| $\beta_1$ | 130 m/s$^2$ | 130 m/s$^2$ |
| $\beta_2$ | 80 m/s$^3$ | 80 m/s$^3$ |

Preferably, the control method is based on a prediction of the most-probable radial-averaged wind speed for the wind turbine, and/or the expected worst-case radial-averaged wind speed.

Preferably, the most probable radial-averaged wind speed for a first blade of a wind turbine is calculated by a weighted average of the current wind speed at the position of the first blade, and the previously measured wind speed at the azimuth angle of interest from a second blade of the wind turbine.

Preferably, the expected worst case radial-averaged wind speed is calculated by adding a gust term to the time-averaged, radial-averaged wind speed:

Preferably, the control method comprises a method for controlling blade pitching, said method based at least in part on a modal representation of the flap-wise motion of the blade.

Additionally or alternatively, the method is operable to determine the desired pitch velocity for a particular change in wind speed to avoid a tower strike.

It is understood that the wind turbine blades generally follow a circular rotational path. In one aspect, the method may be performed as the rotor blade in question is in the 120 degrees of the rotational path of the wind turbine blade prior to passing the wind turbine tower.

Method for Predicting the Wind Speed Based on the Wind Observer

The following describes in brief the equations for predicting firstly, the most probable radial-averaged wind speed over a wind turbine blade and secondly, the expected worst case radial-averaged wind speed, until the next tower passage of the blade. The case is presented for a three-bladed wind turbine having a blade 1, blade 2 and blade 3. It will be understood that the equations may be amended for any suitable wind turbine configuration having any number of wind turbine blades, e.g. a two-bladed wind turbine.

The model is valid for all azimuth angles, but in the following it is only explained how the wind speed is predicted for the last ⅓ of the revolution before blade 1 passes the tower, which is for azimuth angles $240° \leq \Psi \leq 360°$.

It is assumed that blade 3 has just passed the tower and blade 1 is the next blade to pass the tower. The aim is the prediction of the radial-averaged wind speeds, $u_{most\ probable}(\Psi)$, on the oncoming path of blade 1 from its current position, $\Psi_0$, and towards tower passage, $\Psi=360°$.

It is assumed, that the radial-averaged wind speed at the current azimuth position of blade 1, $u_1(\Psi_0)$, is known from the wind observer based on the measured blade tip deflection, velocity and acceleration. It is also assumed, that the radial-averaged wind speeds at blade 3, $u_3(\Psi)$, from the wind observer has been logged for the last passing through the part of the rotor disc of interest. This interval corresponds to $240° \leq \Psi \leq 360°$ for blade 1, but when blade 3 passed through this interval, strictly speaking, the rotor azimuth angle was 120° less, which was $120° \leq \Psi_{rotor} \leq 240°$. However, in this document, the azimuth angle, $\Psi$, will refer relative to the wind field, where $\Psi=0°/360°$ corresponds to the position of the tower. Rotor azimuth angles are not used.

Prediction of the Most Probable Radial-Averaged Wind Speeds

The most probable radial-averaged wind speed is calculated by a weighted average of the current wind speed at the position of blade 1 and the previously measured wind speed at the azimuth angle of interest from blade 3:

$$u_{most\ probable}(\Psi) = \frac{c_1 \cdot u_1(\Psi_0) + c_3 \cdot u_3(\Psi)}{c_1 + c_3} \text{ where} \quad (1)$$

$$c_1 = \frac{1}{\sqrt{\left(\frac{\Delta x}{L_x}\right)^2 + \left(\frac{\Delta y}{L_y}\right)^2}} \quad (2)$$

$$c_3 = \frac{L_z}{\Delta z} \quad (3)$$

$$\Delta x = \sqrt{\frac{1-a}{2}} \cdot R \cdot (\cos\Psi - \cos\Psi_0) \quad (4)$$

$$\Delta y = \sqrt{\frac{1-a}{2}} \cdot R \cdot (\sin\Psi - \sin\Psi_0) \quad (5)$$

$$\Delta z = u_3(\Psi) \cdot \frac{2 \cdot \pi}{B \cdot \omega} \quad (6)$$

$$L_x = 0.1 \cdot L \quad (7)$$

$$L_y = 0.3 \cdot L \quad (8)$$

$$L_z = 1.0 \cdot L \quad (9)$$

a is the axial induction factor (it can be assumed that a≈⅓), R is the rotor radius, B is the number of blades, ω is the rotor speed and L is the turbulent length scale.

Assuming a=⅓, combining equations 2-9 and inserting in equation 1 yield:

$$u_{most\ probable}(\Psi) = \frac{k_1 \cdot u_1(\Psi_0) + k_3 \cdot u_3(\Psi)}{k_1 + k_3} \quad (10)$$

where $$k_1 = \frac{1}{\sqrt{\frac{1}{3}\left(\left(\frac{\cos\Psi - \cos\Psi_0}{0.1}\right)^2 + \left(\frac{\sin\Psi - \sin\Psi_0}{0.3}\right)^2\right)}} \quad (11)$$

$$k_3 = \frac{B \cdot \omega \cdot R}{2 \cdot \pi \cdot u_3(\Psi)} \quad (12)$$

Prediction of the Expected Worst Case Radial-Averaged Wind Speeds

The expected worst case radial-averaged wind speed is calculated by adding a gust term to the time-averaged, radial-averaged wind speed:

$$u_{worst\ case}(\Psi) = \begin{cases} \mu_1(\Psi) + u_{gust}(t); & u_{gust}(t_0) < u_{gust}(\infty) \\ u_{most\ probable}(\Psi); & u_{gust}(t_0) \geq u_{gust}(\infty) \end{cases} \quad (13)$$

where $$u_{gust}(t) = \frac{1}{\ln(2)} \cdot \ln\left(\frac{2}{1 + e^{-t}}\right) \cdot u_{gust}(\infty) \quad (14)$$

$$u_{gust}(t_0) = u_{most\ probable}(\Psi) - \mu_1(\Psi) \quad (15)$$

$$u_{gust}(\infty) = f_{gust} \cdot \sigma_1(\Psi) \quad (16)$$

$$t = t_0 + \frac{\Psi - \Psi_0}{\omega} \quad (17)$$

$$t_0 = -\ln\left(2 \cdot e^{-\frac{u_{gust}(t_0)}{u_{gust}(\infty)} \cdot \ln(2)} - 1\right) \quad (18)$$

$f_{gust}$ is an empirical gust factor. This is a constant in the order of 4 and should be fitted to give best possible results. A higher value gives more safety with respect to risk of a blade/tower collision, but also unnecessary high pitch activity. A lower value gives higher risk of a blade/tower collision, but less pitch activity.

The gust term may be determined through a survey of the wind turbine site, and an analysis of historical wind activity at the site.

$\mu_1(\Psi)$ is the time-average of the radial-averaged wind speed at the azimuth angle $\Psi$, taken as a time-filtered value with a time constant of 1 min. Implementation for discrete time steps yields:

$$\mu_1(\Psi, t_i) = \left(1 - \frac{t_i - t_{i-1}}{t_{filter}}\right) \cdot \mu_1(\Psi, t_{i-1}) + \frac{t_i - t_{i-1}}{t_{filter}} \cdot u(\Psi, t_i) \quad (19)$$

where $t_i$ is the current time and $t_{i-1}$ is the time for the previous update of the time-average of the radial-averaged wind speed $\mu_1(\Psi t_{i-1})$ at the same azimuth angle $\Psi$. $t_{filter}$ is the filtering time constant of 60 s.

Similarly, $\sigma_1(\Psi)$ is the standard deviation over time of the radial-averaged wind speed at the azimuth angle $\Psi$, taken as a time-filtered value with a time constant of 1 min. Implementation for discrete time steps yields:

$$\sigma_1(\Psi, t_i) = \sqrt{\left(1 - \frac{t_i - t_{i-1}}{t_{filter}}\right) \cdot (\sigma_1(\Psi, t_{i-1}))^2 + \frac{t_i - t_{i-1}}{t_{filter}} \cdot (u(\Psi, t_i) - \mu_1(\Psi, t_i))^2} \quad (20)$$

Deflection Control System

A control method for blade pitching is derived, based on a modal representation of the flap-wise motion of the blade as:

$$\ddot{d}_i(t) + 2(\xi_{si} + \xi_{ai})\omega_i \dot{d}_i(t) + \omega_i^2 d_i(t) =$$

$$\frac{1}{2m_i}\rho\frac{dC_l}{d\alpha}\Omega\dot{V}_{oz}\int_{r_1}^{r_2} u_i(r)rc(r)dr - \frac{1}{2m_i}\rho\frac{dC_l}{d\alpha}\Omega^2\dot{\phi}_p\int_{r_1}^{r_2} u_i(r)r^2c(r)dr = \dot{F}_i$$

where $\rho$ is the density of the air, $\Omega$ is the rotational speed of the rotor, $V_{oz}$ is wind speed, r is the distance from the centre of the wind turbine rotor, c(r) is the chord length a distance r from the centre of the rotor hub, $F_i$ is the resultant force on the blade, $\Phi_p$ is the pitch angle, $u_i$, mode shape, and i the mode index.

Integrating this equation once (taking arbitrary constants into account), becomes $$\ddot{d}_i(t) + 2(\xi_{si} + \xi_{ai})\omega_i \dot{d}_i(t) + \omega_i^2 d_i(t) =$$

$$\frac{1}{2m_i}\rho\frac{dC_l}{d\alpha}\Omega(V_{oz} - W_z)\int_{r_1}^{r_2} u_i(r)rc(r)dr -$$

$$\frac{1}{2m_i}\rho\frac{dC_l}{d\alpha}\Omega^2(\phi_p - \phi_0)\int_{r_1}^{r_2} u_i(r)r^2c(r)dr = F_i$$

Solving the equation for $d_i$ determines how much the blade deflects for a certain change in wind speed and pitch angle. Alternatively, the equation may be solved to determine what should the pitch velocity be for a certain change in wind speed to avoid a tower strike.

$$d_i(t) = \frac{\dot{d}_i(0)}{\omega_i\omega_{di}}[e^{-\xi_i\omega_i t}(-\xi_i\omega_i\sin(\omega_{di}t + \varphi) - \omega_{di}\cos(\omega_{di}t + \varphi)) + \xi_i\omega_i\sin\varphi +$$

$$\omega_{di}\cos\varphi] + \frac{\ddot{d}_i(0)}{\omega_i^2\omega_{di}}[e^{-\xi_i\omega_i t}(-\xi_i\omega_i\sin\omega_{di}t - \omega_{di}\cos\omega_{di}t) + \omega_{di}] -$$

$$\frac{\dot{F}_i}{m_i\omega_i^3\omega_{di}}[e^{-\xi_i\omega_i t}(-\xi_i\omega_i\sin(\omega_{di}t + \varphi) - \omega_{di}\cos(\omega_{di}t + \varphi)) +$$

$$\xi_i\omega_i\sin\varphi + \omega_{di}\cos\varphi] + \frac{\dot{F}_i t}{m_i\omega_i^2} \text{ where } \xi_i = \xi_{si} + \xi_{ai},$$

$$\varphi = \tan^{-1}\frac{\sqrt{1 - \xi_i^2}}{\xi_i} \text{ and } \omega_{di} = \omega_i\sqrt{1 - \xi_i^2},$$

where $d_i$ is the modal displacement, $\xi_{si}$ structural damping ratio, $\omega_i$ eigenfrequency, $u_i$ mode shape, i mode index. (For this purpose, only the first flapwise mode is used, that is i=1.)

The aerodynamic damping ratio is given as $$\xi_{ai} = \frac{1}{4m_i\omega_i}\rho\frac{dC_l}{d\alpha}\Omega\int_{r_1}^{r_2} u_i^2(r)rc(r)dr$$

where the generalized mass is $$m_i = \int_{r_1}^{r_2} m(r)u_i^2(r)dr$$

The following constants are to be calibrated for the model:

$$\frac{dC_l}{d\alpha}$$

Lift slope (should be close to $2\pi$).

$W_z$ Axial induced velocity (typical values are 2-3 m/s).

$\varphi_0$ Pitch angle for zero force, accounts for cambered profiles and blade twist (typical values are $\approx 0°=0$ rad).

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

LIST OF REFERENCE NUMERALS 2 wind turbine
4 tower
6 nacelle
8 hub
10 first wind turbine blade
10' second wind turbine blade
10" third wind turbine blade
14 blade tip
16 blade root
17 rotor
18 rotor axis
20 rotor plane
150 wind turbine controller
152 controller interface
154 processor
156 memory
θ pitch
X deflection distance perpendicular to rotor plane
X' deflection speed perpendicular to rotor plane
X" deflection acceleration perpendicular to rotor plane

The invention claimed is:

1. A method of controlling a wind turbine comprising a tower and a rotor provided on top of the tower, the rotor comprising one or more wind turbine blades including a first wind turbine blade that rotates about a rotor axis, the method comprising the steps of:
   collecting first data indicative of a dynamic condition of the first wind turbine blade and the rotor from a sensor system associated with the wind turbine, the first data comprising rotor data and first deflection data, the rotor data being indicative of azimuth position and rotational velocity of the rotor in a rotor plane perpendicular to the rotor axis, and the first deflection data being indicative of position, speed and acceleration of one or more parts of the first wind turbine blade;
   calculating at least one of a most probable radial-averaged wind speed or an expected worst-case radial-averaged wind speed for the wind turbine;
   calculating an expected tower clearance distance at a predicted time of tower passage for the first wind turbine blade based on at least the acceleration of said one or more parts of the first wind turbine blade in a direction perpendicular to the rotor plane and the at least one of a most probable radial-averaged wind speed or an expected worst-case radial-averaged wind speed for the wind turbine;
   evaluating a collision risk criterion based on the expected tower clearance distance by comparing the expected tower clearance distance to at least one of a first threshold value and a second threshold value; and
   performing measures to prevent tower collision based on the collision risk criterion.

2. The method according to claim 1, wherein the first data further comprises wind data indicative of the wind velocity.

3. The method according to claim 1, wherein the calculating an expected tower clearance distance is further based on a stiffness or natural frequency of the first wind turbine blade.

4. The method according to claim 1, wherein the calculating an expected tower clearance is further based on a known first deflection pattern of the first wind turbine blade.

5. The method according to claim 1, wherein the performing measures to prevent tower collision comprises starting the measures at a first azimuth start position of the first wind turbine blade.

6. The method according to claim 1, wherein the performing measures to prevent tower collision comprises pitching the first wind turbine blade according to a first primary pitching scheme.

7. The method according to claim 6, wherein the method further comprises determining the first primary pitching scheme based on the first data.

8. The method according to claim 6, wherein the method further comprises determining the first primary pitching scheme based on a known first deflection pattern of the first wind turbine blade.

9. The method according to claim 6, wherein the method further comprises determining the first primary pitching scheme such that the expected tower clearance distance, when pitching the first wind turbine blade, is in a range from a first expected clearance value to a second expected clearance value.

10. The method according to claim 1, wherein the performing measures to prevent tower collision comprises pitching the first wind turbine blade according to a first primary pitching scheme if the expected tower clearance distance is less than the first threshold value, and pitching the first wind turbine blade according to a first secondary pitching scheme if the expected tower clearance distance is in a range from the first threshold value to the second threshold value.

11. The method according to claim 1, wherein the method further comprises collecting second deflection data indicative of position, speed and acceleration of one or more parts of a second wind turbine blade of the one or more wind turbine blades of the wind turbine, and wherein the calculating an expected tower clearance distance for the first wind turbine blade is further based on the second deflection data.

12. The method according to claim 1, wherein the calculating an expected tower clearance distance comprises determining an expected time to tower passage and wherein the calculating an expected tower clearance distance at said predicted time of tower passage for the first wind turbine blade is further based on the expected time to tower passage.

13. The method according to claim 1, wherein the expected tower clearance distance is calculated as a worst case tower clearance distance based on the position, speed and acceleration of said one or more parts of the first wind turbine blade.

14. The method according to claim 13, wherein the worst case tower clearance distance is based on a known first deflection pattern of the first wind turbine blade.

15. The method according to claim 1, wherein the most probable radial-averaged wind speed for said first wind turbine blade is calculated by a weighted average of a current wind speed at the position of the one or more parts of the first wind turbine blade and of a previously measured wind speed at an azimuth angle of interest from a second wind turbine blade of the one or more wind turbine blades of the wind turbine.

16. A wind turbine controller for controlling a wind turbine comprising a tower and a rotor provided on top of the tower, the rotor comprising one or more wind turbine blades including a first wind turbine blade that rotates about a rotor axis, the wind turbine controller comprising:
a controller interface; and
a processor connected to the controller interface, the wind turbine controller being configured for receiving one or more signals indicative of a dynamic condition of the first wind turbine blade and the rotor, wherein the wind turbine controller is configured for:
collecting first data indicative of the dynamic condition of the first wind turbine blade and the rotor from a sensor system associated with the wind turbine, the first data comprising rotor data and first deflection data, the rotor data being indicative of azimuth position and rotational velocity of the rotor in a rotor plane perpendicular to the rotor axis, and the first deflection data being indicative of position, speed and acceleration of one or more parts of the first wind turbine blade,
calculating at least one of a most probable radial-averaged wind speed or an expected worst-case radial-averaged wind speed for the wind turbine,
calculating an expected tower clearance distance at a predicted time of tower passage for the first wind turbine blade based on at least the acceleration of said one or more parts of the first wind turbine blade in a direction perpendicular to the rotor plane and the at least one of a most probable radial-averaged wind speed or an expected worst-case radial-averaged wind speed for the wind turbine,
evaluating a collision risk criterion based on the expected tower clearance distance by comparing the expected tower clearance distance to at least one of a first threshold value and a second threshold value, and
performing measures to prevent tower collision based on the collision risk criterion.

17. The wind turbine controller according to claim 16, wherein the wind turbine controller is configured for performing said measures to prevent tower collision by sending pitch control signals for controlling the pitch of the first wind turbine blade.

18. The wind turbine controller according to claim 16, wherein the wind turbine controller is configured for predicting said most probable radial-averaged wind speed for the first wind turbine blade by calculating a weighted average of a current wind speed at the position of the one or more parts of the first wind turbine blade and of a previously measured wind speed at an azimuth angle of interest from a second wind turbine blade of the one or more wind turbine blades of the wind turbine.

\* \* \* \* \*